Jan. 16, 1962 G. W. BROWN ET AL 3,017,027
AUTOMATIC SORTING MACHINE
Filed Dec. 2, 1957
3 Sheets-Sheet 1

INVENTORS
GEORGE W. BROWN
GROVER S. HARBEN, JR
BY
ATTORNEY

Jan. 16, 1962   G. W. BROWN ET AL   3,017,027
AUTOMATIC SORTING MACHINE
Filed Dec. 2, 1957   3 Sheets-Sheet 2

INVENTORS
GEORGE W. BROWN
GROVER S. HARBEN, JR.
BY
ATTORNEY

Jan. 16, 1962    G. W. BROWN ET AL    3,017,027
AUTOMATIC SORTING MACHINE
Filed Dec. 2, 1957
3 Sheets-Sheet 3
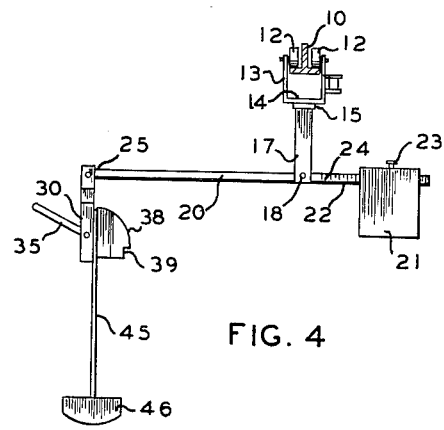
FIG. 4
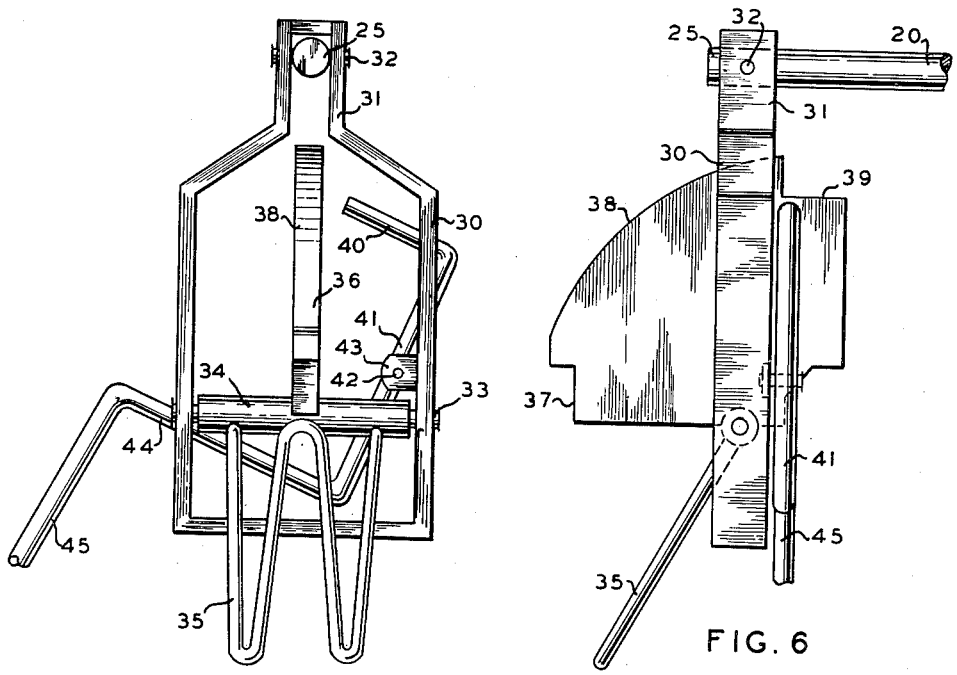
FIG. 5
FIG. 6
INVENTORS
GEORGE W. BROWN
GROVER S. HARBEN, JR.
BY
ATTORNEY 3,017,027
AUTOMATIC SORTING MACHINE
George W. Brown and Grover S. Harben, Jr., Gainesville, Ga., assignors to Gainesville Machine Co., Inc., Gainesville, Ga., a corporation of Georgia
Filed Dec. 2, 1957, Ser. No. 700,066
4 Claims. (Cl. 209—121)

This invention relates to an automatic sorting machine, and is particularly concerned with a device to sort poultry into weight classes through the use of balancing conveyor mechanism constructed and arranged to automatically deposit poultry of different weight classes in different selected locations.

In the sale and distribution of poultry, many economies in handling and distribution may be effected by sorting the poultry into weight classes prior to packaging and delivery. Not only does the weight of the poultry govern the sales price, but many consumers require such grouping regardless of specific weight. For instance, certain retail markets may have a clientele whose demand for one general size may predominate over that of another. Retail distribution, even where all sizes are in demand, is facilitated by pregrouping as to size; and, in the restaurant trade, a generally uniform size is preferred so that like portions may be served to each customer without regard to the fowl from which the portion is taken.

While automatic weight selection mechanisms have heretofore been proposed, they have, for the most part, been either complicated and delicate or inaccurate and cumbersome. The present apparatus provides a novel, simple, and improved mechanism particularly designed for the sorting of poultry, and one which while faithful in operation is simple in construction and well designed to meet the demands of economic manufacture.

In general terms, that form of the present invention, here shown by way of example, may be broadly defined as including individual balance arms adapted to be mounted in spaced relation on a conveyor mechanism to be supported on an overhead rail and moved therealong. Each balance mechanism includes a releasable load securing means for supporting a fowl in an elevated position, the height being determined by its weight. Each mechanism also includes a release trigger to be carried at an elevation commensurate with the weight of the fowl. A series of successively higher fixed trigger actuating fingers are located in the path of travel of the release triggers whereby fowl of particular weight classes will be released in predetermined areas to group the fowl by weight.

It is therefore among the objects of the present invention to provide a novel, simple, and improved automatic sorting mechanism particularly designed for the classification of poultry by weight.

More specifically, it is an object of the present invention to provide a poultry conveyor mechanism including release means for depositing poultry of a predetermined weight class at a predetermined location.

It is also among the objects of the present invention to provide a traveling balance mechanism for conveyors which will retain objects of a given weight range at a given elevated position so as to facilitate the grouping of such objects in weight classes.

A further object of the present invention is to provide a conveyor for poultry having release mechanism positionable in accordance with the weight of the poultry whereby such release mechanism may be selectively actuated at given locations to deliver poultry from the conveyor in accordance with weight.

A still further object of our invention is to provide a novel and improved poultry gripping mechanism operable to suspend and transport poultry and to release the same upon the actuation of a cooperating trip mechanism.

These and other objects, features, and advantages of the present invention will be apparent from consideration of the following specification taken in conjunction with the accompanying drawings, in which:

FIG. 4 is a detail front elevation of the complete balance arm assembly.

FIG. 5 is a detail side elevation showing the support released for discharge of the poultry.

FIG. 6 is a front view of the device in the position shown in FIG. 5.

Figure 1:
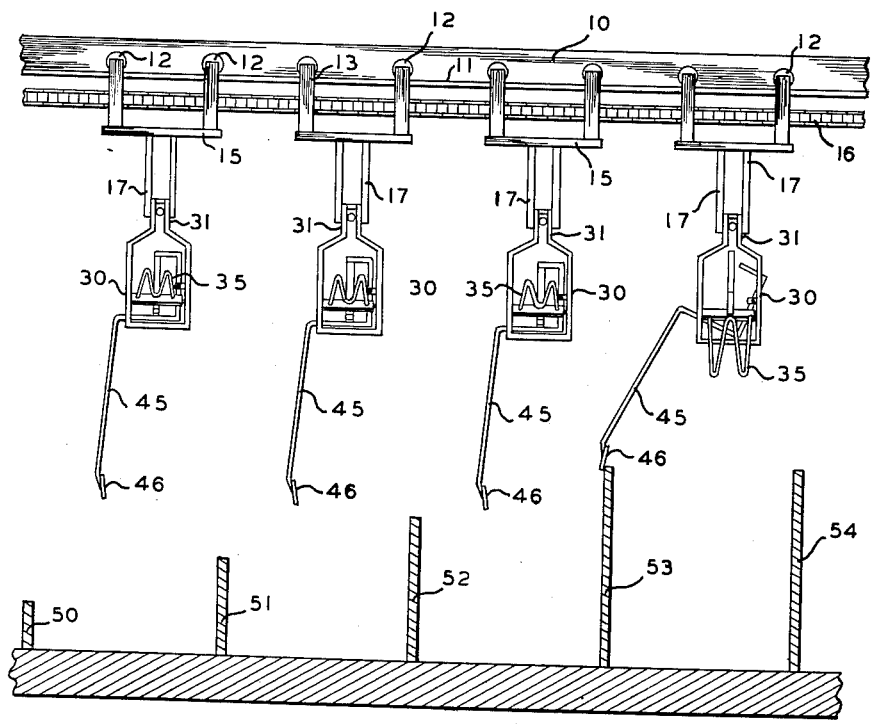
FIG. 1 is a fragmentary side elevation of one form of the present invention.

Referring more particularly to FIGS. 1 and 4 of the drawing, that form of the invention here shown by way of illustration includes a horizontal rigid rail 10 preferably in the form of an inverted T. The opposite lateral flanges 11 of the rail 10 are adapted to receive and support rollers 12 mounted between the upstanding parallel sides 13 of U-shaped carriers 14. The carriers 14 are arranged in pairs, the base of each pair engaging the opposite ends of the bar 15 of individual conveying and balancing units. The outer face of the outer side of each carrier is engaged with a conveyor chain 16 which moves the units therewith along the track in uniform spaced relation. The track and chain arrangement may well be in circular or oval elevated horizontal form so as to provide a repeated path of travel for the units, which path of travel will include a loading station. Suitable drive mechanism (not shown) for the chain may provide either continuous or intermittent motion as desired.

Each bar 15 of each unit includes longitudinally spaced parallel depending arms 17 which mount a pintle 18 pivotally supporting a transversely extending balance arm 20. A counterweight 21 is adjustably movable on the end 22 of each balance arm 20 and is adapted to be secured in adjusted position by suitable means such as the set screw 23. As indicated at 24, the end 22 of the balance arm may be calibrated to assist in the location of the counterweight 21 along the end 22 at such position as to balance a predetermined weight of fowl at a predetermined elevation. Thus it may be seen that a fowl of predetermined weight may balance the arm to horizontal position, while heavier fowl will be suspended by the arm 20 at a lower position and lighter fowl will be suspended above the path of travel of heavier fowl or those suspended by the arm while in horizontal position.

Figures 2, 3:
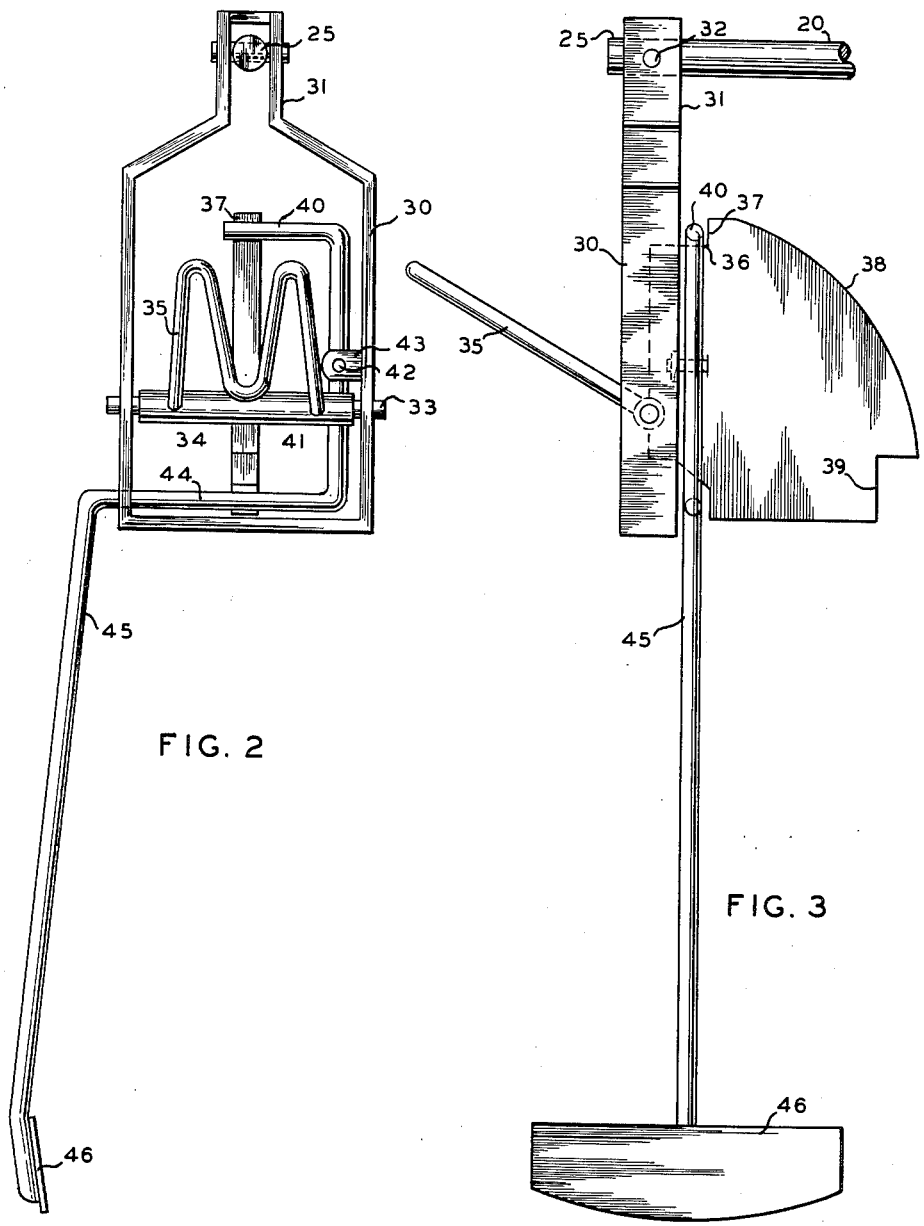
FIG. 2 is a detail side elevation of the poultry suspending device with its release mechanism.
FIG. 3 is a front view of the device of FIG. 2.

At the opposite end 25 of the balance arm 20 there is pivotally supported a fowl supporting claw and release mechanism, shown as comprising a generally rectangular frame 30 preferably formed of narrow flat metal stock and including an upwardly extending neck 31 through which the end 25 extends and to which the neck is pivoted by pintle 32. Near the lower end of the frame 30 there is pivotally mounted between the sides thereof on horizontal trunnions 33 a claw base 34. The claw 35 itself, which engages and supports the fowl, is connected by one end to base 34 and is a bifurcated member having an outwardly extending open ended slot. In the present embodiment, claw 35 comprises a double looped wire element having pairs of return-bent loops providing for engagement and support of a fowl when the claw is in the upwardly tilted load carrying or fowl supporting position as shown in FIGS. 2 and 3. A fowl is supported by the claw 35 in its load carrying position by having the neck or legs of the fowl placed in the slot between the return bend loops. The claw 35 is adapted to release and drop the fowl when the claw drops to the downwardly inclined position shown in FIGS. 5 and 6. For retaining the claw 35 in the upwardly inclined, fowl supporting, position of FIGS. 2 and 3, there is mounted on the claw base 34 a transversely extending flat latch block 60. The upper end of the forward face of the block 60 is recessed as at 36 to form a vertical shoulder 37. From the recess 36, the outer face of the latch block 60 is of arcuate form as at 38, terminating in a recess 39. The claw base 34 and latch block 60 are adapted to be retained in the clockwise rotated position of FIGS. 2 and 3 whereby the claws will support and retain fowl by engagement of a trigger 40 in the recess 36. The trigger 40 is formed as a right angular inward extension of a pivoted straight portion 41 of a release arm 70, which portion is pivotally mounted on a pintle 42 between lugs 43 formed as inward extensions on one of the sides of the frame. Below the pintle 41, the keeper arm 70 is turned at an angle of 90 degrees to a second horizontal straight portion 44 from which it extends downwardly again at 90 degrees to a trigger extension 45 terminating in a feeler plate 46 which may engage one or another of the fixed trigger fingers 50, 51, 52, 53, or 54 of FIG. 1.

This arrangement is such that with the fowl engaged by the claw 35 and the claw in the upwardly inclined position of FIGS. 2 and 3, with the trigger 40 engaged in the notch 36, downward tilting is precluded by the shoulder 37, and the fowl will be suspended and carried by the chain 16. The elevation of the fowl and therewith the trigger 40 and feeler 46 will be determined by the weight of the fowl, the adjustment of the counterweight 21 being such that lighter fowls will be suspended at a higher elevation than heavier fowl and triggering feeler 46 will thus travel at a higher position for light fowl, the travel being toward the right in FIG. 1. Heavier fowl will of course depress the balance arm 20 to travel in a path lower than those of the lighter fowl. The degree of elevation will vary with the various fowl from upwardly inclined position of the balance arm 20 to a downwardly inclined position.

In the operation of our device, fowl may be loaded onto the carrier assemblies by support from the claw 35 and will move therewith toward the right as shown in FIG. 1. Since the element 50 is lower than elements 51, 52, 53, only the heaviest fowl will depress the balance arm 20 to position the trigger feeler 46 at an elevation to engage the first trigger finger 50. If the weight of the fowl is such as to so depress the member 46 that the stop 50 will engage the feeler 46, a pivotal movement of the latch mechanism or release arm 70 will result and the trigger 40 will move from the notch 36 permitting the weight of the fowl to rotate the claw 35 downwardly as in FIGS. 5 and 6 to release the fowl to fall within the area between the fingers 50 and 51. If, however, the fowl is of the lightest order to be sorted, the balance arm 20 will be in an upwardly inclined position to hold the trigger feeler 46 in an elevated position so that in its travel to the right in FIG. 1 it will not engage any of the fingers 50, 51, or 52, but will engage the terminal finger 53, thus releasing the catch mechanism or release arm 70 as it travels beyond the stop 53 to drop the fowl in this area. It will, of course, be understood that intermediate discharge positions are defined by the fingers 51 and 52, and that these may be so arranged as to provide for any desired selection of fowl by weight, so that the fowl may be so classified automatically and as an incident to its travel by the conveyor.

In the practice of the invention, numerous changes, modifications, and the full use of equivalents may be resorted to without departing from the spirit or scope of the invention as defined in the appended claims.

We claim:

1. In a sorting device, a balance arm pivotably carried by each of said support assemblies for pivoting in a vertical plane, a counterweight carried by one end portion of said balance arm, said counterweight being movable toward and away from the pivot of said balance arm, a frame carried by the other end portion of said balance arm, a trunnion carried by said frame, a claw having a bifurcated outer portion for receiving a fowl, said claw being mounted by its inner portion to said trunnion for pivotal movement in a vertical plane from an upwardly inclined fowl carrying position to a downwardly inclined fowl releasing position, a latch block pivotally mounted on said trunnion and connected to said claw for rotation with said claw from its fowl carrying position to its fowl releasing position, a release arm pivotally carried by said frame, said release arm including at one end a trigger engageable in said latch block when said claw is in its fowl carrying position and being movable out of said latch block upon pivotal movement of said release arm, and means for actuating said release arm.

2. In a sorting device of the class having an endless track with a conveyor movable along said track, the combination therewith of a plurality of spaced supporting assemblies engaged by said conveyor and movable simultaneously along said track by said conveyor, a plurality of upstanding fingers mounted below said track and spaced from each other and being progressively higher in the direction of travel of said conveyor, a balance arm pivotably carried by each of said support assemblies, a counterweight carried by one end portion of said balance arm, a frame carried by the other end portion of said balance arm, a trunnion carried by said frame, a claw having a bifurcated outer portion for receiving a fowl, said claw being mounted by its inner portion to said trunnion for pivotal movement in a vertical plane from an upwardly inclined fowl carrying position to a downwardly inclined fowl releasing position, a latch block pivotally mounted on said trunnion and connected to said claw for rotation with said claw from its fowl carrying position to its fowl releasing position, a release arm pivotally carried by said frame engageable with said latch block when said claw is in its fowl carrying position and being movable out of engagement upon pivotal movement of said release arm.

3. In a sorting device, a balance arm pivotably carried at a predetermined height for pivoting in a vertical plane, a counterweight carried by one end portion of said balance arm, said counterweight being movable toward and away from the pivot of said balance arm, a frame carried by the other end portion of said balance arm, a horizontal trunnion carried by said frame, a claw having a bifurcated outer portion for receiving a fowl, said claw being mounted by its inner portion to said trunnion for pivotal movement in a vertical plane from an upwardly inclined fowl carrying position to a downwardly inclined fowl releasing position, a latch block pivotally mounted on said trunnion and connected to said claw for rotation with said claw from its fowl carrying position to its fowl releasing position, said latch block being provided with a recess, and a release arm pivotally carried by said frame, said release arm being pivotable in a plane parallel to the travel of said conveyor, said release arm including at one end a trigger engageable in said recess of said latch block when said claw is in its fowl carrying position and being movable out of said recess upon pivotal movement of said release arm, said release arm including at its other end a downwardly extending feeler for actuation by an external object to cause movement of said trigger out of said recess.

4. In a sorting device of the class having an endless track with a conveyor movable along said track, the combination therewith of a plurality of spaced supporting assemblies engaged by said conveyor and movable simultaneously along said track by said conveyor, a plurality of upstanding fingers mounted below said track and spaced from each other to define fowl receiving areas, said fingers being aligned parallel to the travel of the conveyor and being progressively higher in the direction of travel of said conveyor, a balance arm pivotably carried by each of said support assemblies for pivoting in a vertical plane, a counterweight carried by one end portion of said balance arm, said counterweight being movable toward and away from the pivot of said balance arm, a frame pivotally depending from the other end portion of said balance arm, a horizontal trunnion carried by said frame, a claw having a bifurcated outer portion for receiving a fowl, said claw being mounted by its inner portion to said trunnion for pivotal movement in a vertical plane normal to the travel of the conveyor, said claw being pivotable from an upwardly inclined fowl carrying position to a downwardly inclined fowl releasing position, a latch block pivotally mounted on said trunnion and rigidly connected to said claw for rotation with said claw from its fowl carrying position to its fowl releasing position, said latch block being provided with a recess, and a release arm pivotally carried by said frame, said release arm being pivotable in a plane parallel to the travel of said conveyor, said release arm including at one end a trigger engageable in said recess of said latch block when said claw is in its fowl carrying position and being movable out of said recess upon pivotal movement of said release arm, said release arm including at its other end a downwardly extending feeler, the lower end of which is selectively engageable with any one of said fingers, whereby the height at which said other end of said balance arm holds said release arm determines which of said fingers said end engages as said conveyor moves said balance arm over said fingers, said claw and said feeler of said release arm being so spaced apart vertically that a fowl carried between the bifurcated portion of said claw is released to fall adjacent said fingers upon continued movement of said frame after the engagement of said end of said feeler with one of said fingers.

References Cited in the file of this patent
UNITED STATES PATENTS

| | | |
|---|---|---|
| 1,246,463 | Price | Nov. 13, 1917 |
| 1,731,095 | Draeger | Oct. 8, 1929 |
| 2,138,475 | Hilton | Nov. 29, 1938 |
| 2,435,706 | Barker | Feb. 10, 1948 |
| 2,471,711 | Altenpohl | May 31, 1949 |